US006446504B1

(12) United States Patent
Maginnis, Jr.

(10) Patent No.: US 6,446,504 B1
(45) Date of Patent: Sep. 10, 2002

(54) CONSTANT TEMPERATURE GRADIENT DIFFERENTIAL THERMAL MASS FLOW SENSOR

(75) Inventor: Thomas O. Maginnis, Jr., Dracut, MA (US)

(73) Assignee: MKS Instruments, Inc., Andover, MA (US)

(*) Notice: Subject to any disclaimer, the term of this patent is extended or adjusted under 35 U.S.C. 154(b) by 0 days.

(21) Appl. No.: 09/539,109

(22) Filed: Mar. 30, 2000

(51) Int. Cl.[7] .................................................. G01F 1/68
(52) U.S. Cl. ................................. 73/204.27; 73/202.5
(58) Field of Search ........................... 73/202.5, 202, 73/204.27, 204.25

(56) References Cited

U.S. PATENT DOCUMENTS

| | | | |
|---|---|---|---|
| 4,519,246 A | 5/1985 | Hartemink | 73/204 |
| 4,559,814 A | 12/1985 | Sato et al. | 73/118 |
| 5,036,701 A | 8/1991 | van der Graaf | 73/204.12 |
| 5,142,907 A | 9/1992 | Hinkle | 73/204.12 |
| 5,195,367 A | 3/1993 | Hohenstatt et al. | 73/204.26 |
| 5,259,243 A | 11/1993 | Drexel et al. | 73/204.25 |
| 5,461,913 A | 10/1995 | Hinkle et al | 73/204.25 |
| 5,693,880 A | 12/1997 | Maginnis, Jr. | 73/202.5 |
| 5,792,952 A * | 8/1998 | Ritchart | 73/204.27 |

OTHER PUBLICATIONS

P.M.S. Blackett et al., "A Flow Method For Comparing The Specific Heats Of Gases", Part I.—The Experimental Method, Part II.—The Theory Of The Method, Laboratory of Physical Chemistry, Cambridge, MA, (Communicated by Sir Ernest Rutherford, P.R.S.—Received Oct. 11, 1929), pp. 319–354.

K. Komiya et al., "Characteristics Of A Thermal Gas Flowmeter", Rev. Sci. Instrum. 59 (3), Mar. 1988, pp. 477–479.

* cited by examiner

Primary Examiner—Harshad Patel
(74) Attorney, Agent, or Firm—McDermott, Will & Emery (57) ABSTRACT

A thermal mass flow sensor in which heat transfer to and from a fluid flowing through a sensor conduit is optimized by establishing a symmetrical triangular temperature distribution along a heated length of the sensor conduit. The sensor conduit is heated by a pair of distributed heat sources and a concentrated heat source located between the distributed heat sources. The heater density of the sensor conduit increases linearly from the outer ends of the distributed heat sources towards the center of the heated length of the sensor conduit, and spikes to a substantially greater value at a point corresponding to the centrally located concentrated heat source. The temperature distribution function along the flow sensor tube is a substantially symmetric triangular function.

12 Claims, 5 Drawing Sheets

CONSTANT TEMPERATURE GRADIENT DIFFERENTIAL THERMAL MASS FLOW SENSOR

TECHNICAL FIELD

The present invention relates generally to thermal mass flow sensors, and more particularly to a differential thermal mass flow sensor which is designed to provide a constant temperature gradient in the transfer of heat to and from a fluid flowing through the sensor.

BACKGROUND OF THE INVENTION

The mass flow rate of a fluid is known to be proportional to the amount of heat required to elevate the fluid temperature by a fixed amount as it flows through a laminar flow channel. In a differential thermal flow sensor, the fluid passes through a conduit in which a symmetrically increasing and decreasing temperature distribution is maintained, and a comparison is made between heat transfer to and from the fluid to determine the flow rate of the fluid in the conduit.

Sensors which operate on the basis of this principle generate a flow signal that is proportional to the mass flow rate. They also generate a small noise signal that is random in character and slowly fluctuating in time. For a simple sensing conduit (with no bypass), the amplitude of the noise signal is essentially independent of flow, yet dependent on the thermal properties of the fluid flowing in the conduit. Because the noise signal is present even at zero flow, it is referred to as "zero-flow noise". The zero-flow noise limits the instantaneous flow resolution of the thermal flow sensor over its entire flow sensing range. It also defines the minimum flow that can be effectively measured using a particular sensor. Finally, the presence of a significant, slowly fluctuating zero-flow noise signal hinders the calibration (particularly the zeroing) of instruments employing thermal flow sensors.

The zero-flow noise of these thermal flow sensors appears to be caused by a slow thermal churning or amplitude-limited thermal instability of a fluid in contact with (primarily within) the sensor conduit. For conventional sensors that operate by detecting relative resistance changes caused by small flow-induced temperature differentials on resistive heaters located symmetrically on the inlet and outlet halves of the sensor conduit, the amplitude of the zero-flow noise signal is several orders of magnitude larger than the well-known Johnson noise expected from such resistive heaters at the operating temperature of the sensor in the range of frequency bandwidths commonly employed.

Because some sensor designs are intrinsically less noisy than others, it would be advantageous to design a sensor which reduces the sensor zero-flow noise relative to the sensor flow signals of flow sensors known in the art.

As the zero-flow temperature fluid profile along the sensor conduit approaches the shape of a symmetrical (isosceles) triangle, the zero-flow sensor noise decreases dramatically relative to the flow-induced sensor signal. This may be a result of the insignificance or absence of non-uniform heat conduction along the heated flow path (term involving the second derivative of temperature with respect to position along the sensor length) in heat conduction equations applied to these sensors in comparison to convection along the heated flow path (term involving the first derivative of temperature with respect to position along the sensor length). For a sensor with a triangular temperature distribution profile, all such second derivative terms are zero everywhere along the thermally active conduit length except at the apex of the triangular temperature distribution.

Figure 2:
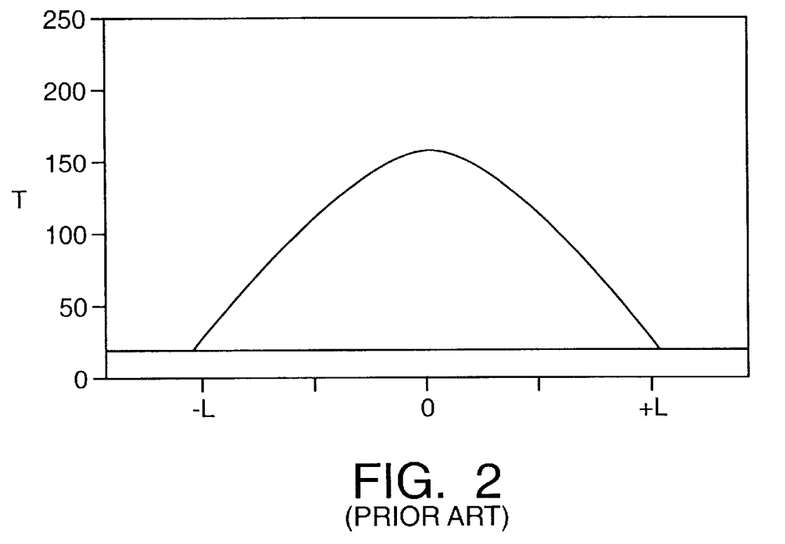
FIG. 2 is a graph illustrating the temperature distribution function, $T(x)$, for the thermal mass flow sensor of FIG. 1.
Figure 5:
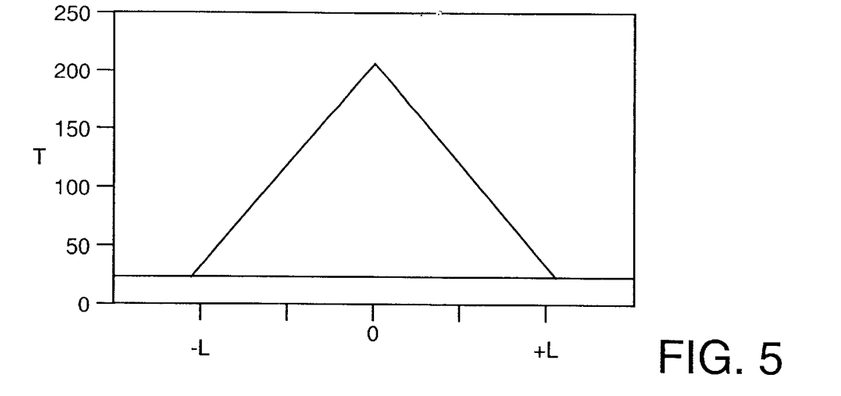
FIG. 5 is a graph illustrating the temperature distribution function, $T(x)$, for the mass flow sensors of the invention.

The tapered heater sensor disclosed in U.S. Pat. No. 5,693,880 to Maginnis, Jr., assigned to the assignee of the present invention (hereafter, the '880 patent), provides an approximately triangular temperature distribution profile away from the center of the heated flow conduit, with a blunted apex at the center of the heated conduit that can extend over a significant portion of the conduit length, as shown in the graph of FIG. 2. The present invention describes a heat source arrangement which provides a nearly perfectly symmetrical triangular temperature distribution profile at zero flow with a sharply pointed apex, as shown in the graph of FIG. 5.

The term "heater density", as used herein, refers to the heating power applied to a heated flow passageway per unit length of the passageway in a thermal flow sensor. Heater density is a continuous function of position along the heated portion of the flow passageway. It is known that a mass flow sensor which is characterized by a rectangular heater density function, in which the heating power is constant over the heated length of conduit, will exhibit nonlinearities in the temperature distribution profile. Such nonlinearities are disadvantageous, as they are associated with relatively high noise, reduced sensitivity, non-uniform heat transfer to and from the flowing fluid, and a reduced range of flow rates that are measurable with the sensor.

The '880 patent discloses a differential thermal mass flow sensor that provides a non-uniform heater density over the heated portion of the flow sensor conduit. The flow sensor conduit may be heated, for example, with a pair of resistive wire conductors which are wound nonuniformly around a conventional cylindrical sensor tube so that the windings are most closely spaced at the junction of the two conductors, and most widely spaced at the outer ends of the conductors. This nonuniform winding configuration provides a tapered, or uniformly varying, heater density, wherein the heating power is nonuniform over the length of the winding.

In the flow sensor of the '880 patent, the temperature of the fluid varies approximately linearly as a function of position at some distance from the junction of the conductors, and nonlinearly in the region at the junction of the conductors. This temperature distribution profile is shown in FIG. 2 as a triangle having a flattened apex. The flattened apex portion of the temperature distribution function is caused by insufficient heating power at the junction of the conductors and is associated with reduced sensitivity, increased noise due to thermal instability, and generally decreased flow sensor performance relative to the performance expected from a more nearly ideal sensor with a triangular temperature distribution profile which extends over nearly the full length of the sensor.

Accordingly, it would be advantageous to provide a thermal mass flow sensor which can provide more nearly ideal heat transfer to and from a flowing fluid without inducing these and other deficiencies.

SUMMARY OF THE INVENTION

According to one aspect of the invention, there is provided a thermal mass flow sensor comprising a flow sensor conduit adapted for fluid flow therethrough, a first heating element disposed proximal to the sensor conduit and configured to establish a distributed, uniformly varying heater density along a portion of a heated length of the sensor conduit, and a second heating element disposed proximal to the sensor conduit and to the first heating element and configured to establish a concentrated heater density at a preselected location within the heated length of the sensor conduit. The temperature distribution function of a fluid within the heated length of the sensor conduit is a substantially symmetrical triangular distribution function.

The first heating element preferably comprises a pair of distributed heat sources. The second heating element preferably comprises a single concentrated heat source which is disposed between the two distributed heat sources. In a preferred embodiment, the distributed heat sources are symmetrically disposed on the sensor conduit with respect to the concentrated heat source, which is located between them, preferably at or near the midpoint of the heated length of the sensor conduit.

The distributed heater density in the flow sensor of the invention preferably increases uniformly from substantially equal minimum values near the ends of the heated length of the sensor conduit toward the center of the heated length of the conduit, and then spikes to a substantially greater value at a point corresponding to the centrally located concentrated heat source. The preferred minimum value of the distributed heater density is zero, or as close to zero as is practical for sensor manufacture, and occurs at the outer ends of the heated portion of the sensor conduit.

In a preferred embodiment, the distributed heat sources provide minimum heat at the ends of the heated length of the sensor conduit and maximum heat at or near the midpoint of the heated length of the conduit. In one preferred embodiment, the distributed heat sources comprise resistive heat sources, such as, for example, resistive coils wound around the a conventional cylindrical tube, or resistive films deposited onto such a sensor tube. In another embodiment, the distributed heat sources comprise radiant heat sources, such as, for example, optical fiber arrays which are disposed about the flow sensor conduit in such a manner as to direct radiant energy onto the conduit and produce the desired triangular temperature distribution along the heated length of the conduit.

If resistive coils or radiant heating optical fibers are employed as the distributed heat sources, the spacing of adjacent windings of the coils or ends of the fibers preferably varies continuously with position on the sensor conduit so as to achieve the desired temperature distribution profile. If resistive films are employed as the distributed heat sources, the thickness and/or width of the deposited films preferably varies continuously with position along the sensor conduit in order to achieve the desired temperature distribution profile. For example, greater heat is provided from a closely wound coil and from a thinner and/or narrower resistive film. Therefore, for maximum heating near the center of the heated length of the tube, coils are wound more closely and resistive films are thinnest and narrowest. Conversely, less heat is provided from a coil having widely spaced turns and from thicker and/or wider resistive films. Therefore, for minimum heating near the ends of the heated length of the tube, coils are more loosely wound, and resistive films are thickest and/or widest.

The thermal mass flow sensor further includes connections for providing an electrical current to the first and second heating systems.

The first heating system preferably functions also as a differential thermal sensor and is adapted to generate a signal representative of fluid temperature differential at symmetric locations on the upstream and downstream portions of the heated length of the conduit, and thus of the fluid flow rate through the sensor conduit. The temperature sensing function may also be separated from the heating function used to establish the triangular temperature distribution by providing additional uniform resistive windings or films, electrically insulated from the primary heating elements, on the upstream and downstream portions of the heated length of the sensor conduit. They may be operated at low power dissipation so as to produce negligible heating themselves. In the embodiment employing end radiation from a plurality of optical fibers to establish a triangular temperature profile, it may also be desirable to employ electrically resistive elements (windings or films) as passive temperature sensors to sense flow-induced temperature changes along the sensor conduit. All such variations and substitutions of alternate differential temperature sensing elements applied to different portions of the flow conduit are considered to fall within the scope and claims of this invention, provided that the zero-flow temperature distribution along the flow conduit is approximately symmetrically triangular, as described above.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be made to the following detailed description taken in connection with the accompanying drawings, in which.

Like features in the respective drawings are indicated by like numerals.

DETAILED DESCRIPTION OF THE DRAWINGS

The present invention combines a concentrated heat source with a pair of uniformly varying distributed heat sources to achieve a substantially symmetric triangular zero-flow temperature distribution profile along a flow sensor conduit. When fluid is flowing in the conduit, the heat sources provide a constant temperature gradient and optimized heat transfer between the sensor conduit and the fluid flowing through the sensor conduit. Heat is uniformly transferred from the sensor conduit to the fluid in the upstream half of the heated portion of the sensor conduit, and from the fluid to the sensor conduit in the downstream half of the heated portion of the sensor conduit. The resulting temperature distribution function, $T(x)$, is a symmetrical triangular function of temperature versus position along the sensor conduit and also, to a close approximation, along the fluid volume within the conduit. The temperature of the fluid increases uniformly from ambient at the upstream and downstream ends of the heated portion of the sensor conduit to a maximum temperature at about the midpoint of the heated portion of the conduit. It is at this midpoint on the sensor conduit that the concentrated heat source is located.

A symmetric triangular temperature distribution function is believed to be a preferred temperature distribution for optimum low-noise flow sensor performance. This is because the flow signal is proportional to the temperature gradient (or first spatial derivative) along the conduit, which is substantially constant. A spatially varying temperature gradient (or non-zero second derivative) along the conduit apparently induces flow-independent thermal processes which are unstable and produce noise in the flow sensor. Thus the broad, rounded peak region in the temperature distribution profile of the prior art sensor of FIG. 2, in which a very small temperature gradient exists simultaneously with a large spatial variation in that temperature gradient, is a region in which noise is relatively strong and the flow signal is relatively weak.

The present invention is a flow sensor which provides a triangular temperature distribution profile, as shown in FIG. 5, and preserves a constant temperature gradient in each half of the sensing region, while the blunted portion at the apex of the temperature distribution profile is conformed to a very short length of the sensor and is fixed at the position of the central concentrated heater, where no flow sensing element is located.

Since the flow sensor signal-to-noise ratio limits both the minimum flow that can be accurately sensed and the resolution of flow measurement at higher flow rates, the improvement of flow sensor signal-to-noise ratio is a primary objective of flow sensor design. Such improvement also tends to ameliorate the flowmeter zeroing difficulties by reducing the amplitude of the zero-flow noise to negligible levels relative to the flow sensor full-scale output signal.

As mentioned, the flow signal is a function of the temperature gradient along the flow sensor conduit. Signal noise from thermal instability, among other causes, indicates nonlinear changes in fluid temperature along the flow sensor conduit. Thus, the sensor signal to noise ratio can be maximized by defining a fluid temperature distribution function which has a constant slope, i.e., a profile for which the change in fluid temperature per unit length of the sensor conduit is a constant value, without any curvature or non-linearities in the function. The only temperature distribution function that rises and falls linearly with position along the conduit and which satisfies these conditions is a triangular function.

This function can be realized in practice by employing a sensor with heaters that are configured to provide a spatially variable heater density function.

It is possible to understand heuristically how this works from the following line of reasoning. Suppose one has the desired perfectly triangular temperature distribution along the sensor conduit. Then, because the conduit has finite lengthwise thermal conductivity, there would have to be a heat current of constant magnitude conducting in opposite directions along the upstream and downstream portions of the conduit, from high temperature to low, from the center temperature peak to the ends. This can only happen if there is a concentrated source of heat between the upstream and downstream portions to feed the upstream- and downstream-directed thermal currents that depart from that point. If the sensor conduit had no surface heat loss per unit length, a concentrated heat source at the midpoint of the sensor length would be the only source required. The centrally injected heat current would then conduct through both upstream and downstream lengths and be absorbed in the thermal clamp at the conduit ends. However, real sensor conduits lose heat through the surfaces. If uncompensated, this surface loss would make the triangular temperature profile sag along the sides to form an exponential cusp. It is therefore necessary to replace the heat lost through the surface of the conduit by employing a distributed heat source that varies in strength with position along the conduit, so as to equal everywhere the local surface heat loss. For a triangular temperature distribution and uniform surface loss coefficient, the local surface heat loss function is proportional to the local temperature elevation (above ambient) and is also a triangular function. A distributed heat source with a symmetrical triangular heater density and appropriate strength can therefore effectively compensate for the surface heat loss that would occur with only a concentrated centrally located heater, and restore the temperature distribution function from an exponential cusp to the desired symmetrical triangle.

Thus, a properly proportioned 's"church and steeple", or "roof and chimney" heater density function can produce the optimal, perfectly symmetrical triangular temperature distribution along the sensor conduit or tube, with associated high flow sensitivity and low zero-flow thermal noise.

Figure 1:
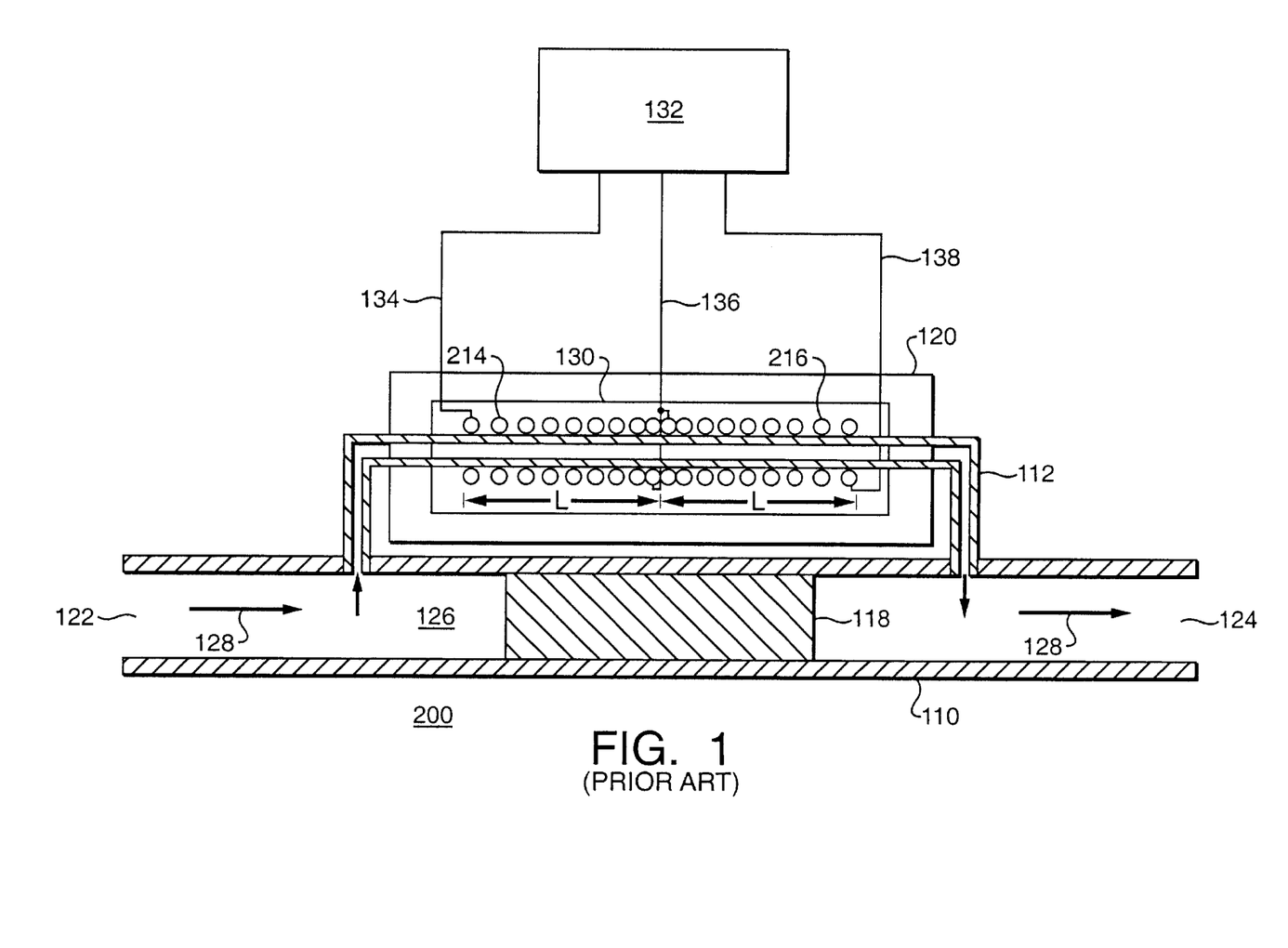
FIG. 1 is a partial block diagram and partial radial cross-section of a thermal mass flow sensor known in the prior art.

As shown in FIG. 1, a mass flow sensor 200 known in the prior art includes a principal flow conduit 110, which may include a laminar flow bypass element 118, and secondary flow passageway which is also referred to as the flow sensor tube 112. Sensor tube 112 is sized to ensure only laminar flow therethrough. The flow sensor includes a pair of heating elements 214, 216, which can be, for example, resistive coils that are wound nonuniformly around sensor tube 112 so as to provide nonuniform heating of the sensor tube. Each heating element is shown extending axially for a length of L along corresponding portions of the sensor tube 112.

The upstream end of heating element 214 is electrically connected to an electronic measuring circuit 132 via a wire 134. The node electrically connecting the downstream end of heating element 214 and the upstream end of heating element 216 is electrically connected to circuit 132 via a wire 136. The downstream end of heating element 216 is electrically connected to circuit 132 via a wire 138. Circuit 132 measures the difference in the amount of heat conducted away from the heating elements 214, 216 by sensing their respective electrical resistances and generates an output signal that represents the mass flow rate of the fluid 126 flowing through sensor conduit 112. Since the mass flow through sensor conduit 112 is a fixed portion of the total amount of mass flowing from the input port 122 to the output port 124 of the principal flow conduit per unit of time, this output signal is also representative of the total mass flow rate through flow sensor 200. U.S. Pat. No. 5,461,913, issued to Hinge et al. on Oct. 31, 1995, which is assigned to the assignee of the present invention, discloses one form of the measuring circuit 132 that may be used with flow sensor 200. Many other sensing circuits are known in the prior art for measuring differential resistance. Thermal clamp 120, which may be part of a casing for the flow sensor 200, encloses heating elements 214, 216 within aperture 130. Thermal clamp 120 is mounted to, and makes good thermal contact with, sensor conduit 112 near the upstream end of heating element 214 and near the downstream end of heating element 216. Thermal clamp 120 is typically fabricated from a material having a high thermal conductivity relative to the thermal conductivity of sensor conduit 112 and thermally anchors the ends of the heated length of the sensor conduit 112.

In operation, fluid 126 flows from the input port 122 to the output port 124 in a bypass channel 110 in the direction of arrows 128, and a portion of the fluid flows through a restrictive laminar flow element 118. The remaining fluid flows through sensor conduit 112. Circuit 132 causes an electrical current to flow through heating elements 214, 216 so that they generate and apply heat directly to sensor conduit 112, as well as indirectly to the fluid 126 flowing through sensor conduit 112. Heat is exchanged between the fluid 126, which is normally at ambient temperature prior to entering input port 122 and upon exiting output port 124, and the sensor conduit as the fluid passes through the conduit. Within the design flow range of the sensor, the upstream heating element 214 transfers some heat to flowing fluid 126 in the upstream half of the heated conduit, and the flowing fluid 126 returns this heat to the downstream sensing element 216 in the downstream half of the heated conduit. This flow-induced transfer of heat from the upstream half of the flow sensor conduit 112 to the downstream half tends to cool the upstream heating element 214 and to warm the downstream heating element 216 by approximately equal amounts. The difference between the flow-induced heating experienced by the downstream heating element 216 and the flow-induced cooling experienced by the upstream heating element 214 indicates the mass flow rate of the fluid 126 through the sensor conduit 112.

As shown in the graph of FIG. 2, the sensor conduit 112 is at substantially ambient temperature at the beginning and end of its heated length, i.e., at −L and at +L. The temperature of the heated length of the sensor conduit increases approximately linearly with increasing distance from the outer ends of the heating elements towards the midpoint of the heated length of the conduit, at the junction of the heating elements. The temperature distribution function, T(x), becomes nonlinear near this location, because of insufficient heating power at the junction of the heating elements. Performance of the prior art flow sensor is correspondingly diminished as a result of reduced sensitivity and relatively higher signal noise in the region between the heating elements.

Figure 3:
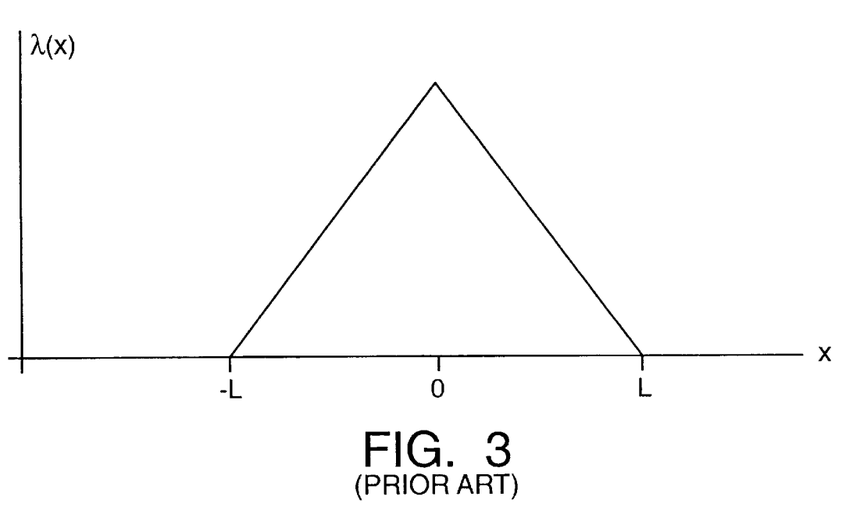
FIG. 3 is a graph illustrating a uniformly varying heater density function, $\lambda(x)$, for the mass flow sensor of FIG. 1.

FIG. 3 is a graph of the heater density function, λ(x), of the prior art mass flow sensor of FIG. 1. It shows a triangular profile, with the heater density increasing uniformly from −L to 0 and decreasing uniformly from 0 to +L. As previously mentioned, the distributed heat sources, by themselves, provide a less than optimal heat transfer to and from the fluid flowing through the sensor because of a temperature drop (relative to the ideal triangular distribution) in the vicinity of the junction of the heat sources.

In order to achieve uniform heat transfer between the sensor conduit and the fluid flowing in the conduit throughout the heated length of the conduit, a constant heater density gradient in the flow direction must be established. In a differential temperature sensor employing two heating elements, the upstream heating element should produce a positive heater density gradient and the downstream heating element should produce an equal negative heater density gradient, so that the flowing fluid cools the portion of the sensor conduit associated with the upstream heating element and warms the portion of the sensor conduit associated with the downstream heating element. This is the basis of the tapered, or uniformly varying, heating concept disclosed in the '880 patent.

However, as shown in the graph of FIG. 2, the temperature distribution function, T(x), of the prior art mass flow sensor is nonlinear in the region near the junction of the two heating elements. In order to achieve a linear relationship between temperature and position on the sensor conduit, additional heat beyond that which can be obtained with the distributed heat sources is required.

The desired sharp peak of the triangular temperature distribution profile may be described mathematically as an isolated discontinuity in the temperature gradient at the junction of the distributed heat sources. Merely providing a triangular heater density function, as in the prior art (FIG. 3), cannot produce such a sharp peak in the corresponding temperature distribution (FIG. 2), because the temperature distribution function and the temperature gradient must both be continuous functions for any continuous heater density function.

However by employing a heater density function with an isolated point discontinuity (a spike) at a central point, it is possible to create the desired isolated discontinuity in temperature gradient needed to provide a sharp peak in the temperature distribution function. Such an isolated heat source will not, by itself, produce a triangular temperature distribution. Instead, it will provide a peaked temperature distribution profile which has exponentially curving flanks (see, for example, FIG. 9 of the '880 patent).

By employing a sensor which provides both a continuous, spatially distributed, symmetric triangular heater density function (as described in the '880 patent) and an isolated or concentrated (spike) heat source at the location between the heat sources which corresponds to the apex of the desired temperature distribution function, it is possible to produce a triangular temperature distribution along the entire heated length of the sensor conduit. A mathematical derivation of the optimal heater density function is given in attached Appendix I.

In practice, a spatially concentrated, centrally located heater with a great, but finite, heater density that extends over a finite, preferably small, length relative to the length of the upstream and downstream heaters produces a temperature peak which is blunted only in the immediate region of the concentrated centrally located heater, which region may be made substantially shorter than the blunted portion of the temperature distribution profile of the prior art sensor (FIG. 2). With this implementation the portions of the zero-flow temperature distribution function for the conduit along the heated upstream and downstream lengths, at which the actual flow sensing is done, remain linear. Mathematical Appendix II provides a derivation of one possible heater density function, everywhere finite, that can achieve this implementation in practice. Thus, the concentrated, but not infinite, heater density function of FIG. 6 will produce the conduit temperature distribution profile of FIG. 5. In contrast, the heater density function of FIG. 3 produces the conduit temperature profile of FIG. 2. For purposes of comparison, both heater configurations were applied to the same conduit, with the same thermal conductivity, the same surface heat loss coefficient, with the same total heating power delivered to the conduit.

Figure 4A:
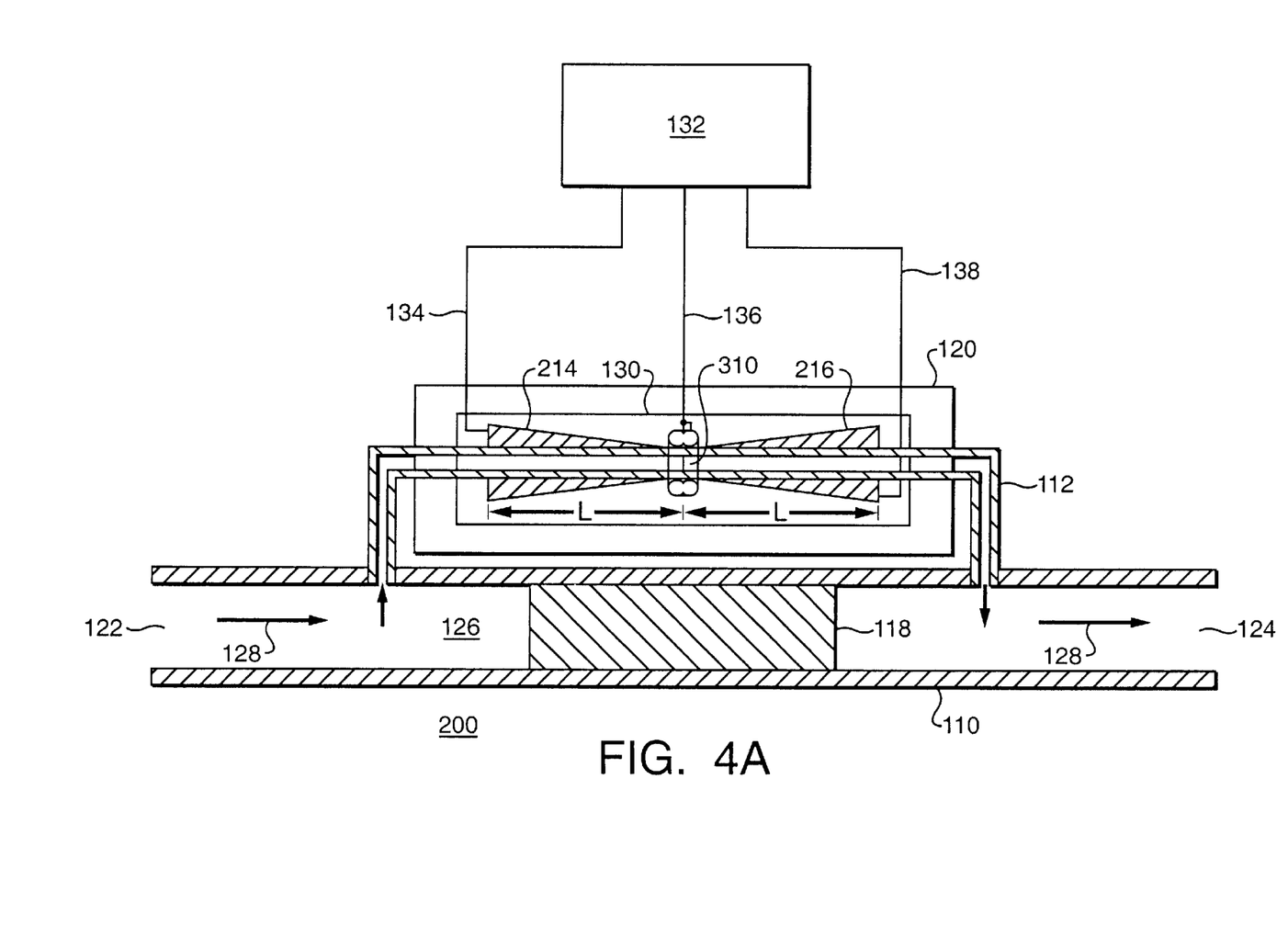
FIG. 4A is partial block diagram and partial radial cross-section of a thermal mass flow sensor according to one embodiment of the invention.
Figure 4B:
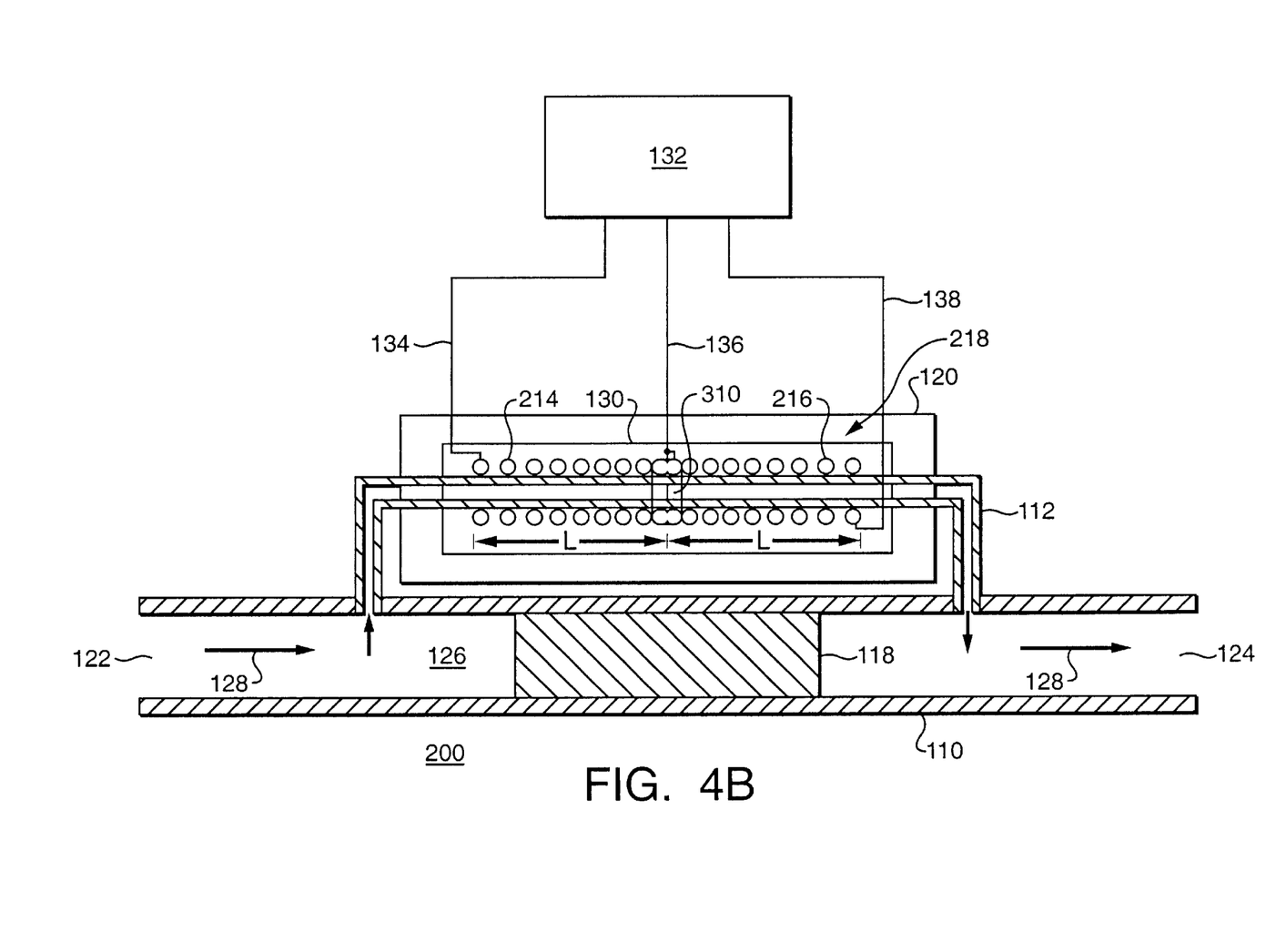
FIG. 4B is a partial block diagram and partial radial cross-section of a thermal mass flow sensor according to another embodiment of the invention.

FIGS. 4A and 4B show a thermal mass flow sensor according to the present invention. Distributed heat sources 214 and 216, illustrated generally as uniformly varying heat sources in FIG. 4A and as resistive coils 218 in FIG. 4B, are in thermal communication with portions of the sensor conduit 112 between −L and +L to provide distributed and uniformly varying heating of the sensor conduit, and the fluid flowing therein, between −L and0 and0 and +L. Between −L and0 the temperature of the sensor conduit increases uniformly, and between0 and +L the temperature of the sensor conduit decreases uniformly, as indicated in the temperature distribution function of FIG. 5. The distributed heat sources 214, 216 deliver heat at each point along the sensor conduit in the amount needed at each point to replace heat lost due to conduction and radiation from the outer and inner surfaces of the sensor conduit, which loss is a function of the local temperature.

A single concentrated heat source 310 is located between the distributed heat sources 214, 216 at 0, halfway between −L and +L, order to provide a spike of heating power at that location. This spike of power occurs at a point which corresponds to the flattened apex of the triangular temperature distribution profile which is obtained when only two distributed heat sources are used. The concentrated heat source 310 provides a given amount of heating power, which is divided substantially evenly between the upstream and downstream portions of the heated length of the sensor conduit on either side of 0.

Figure 6:
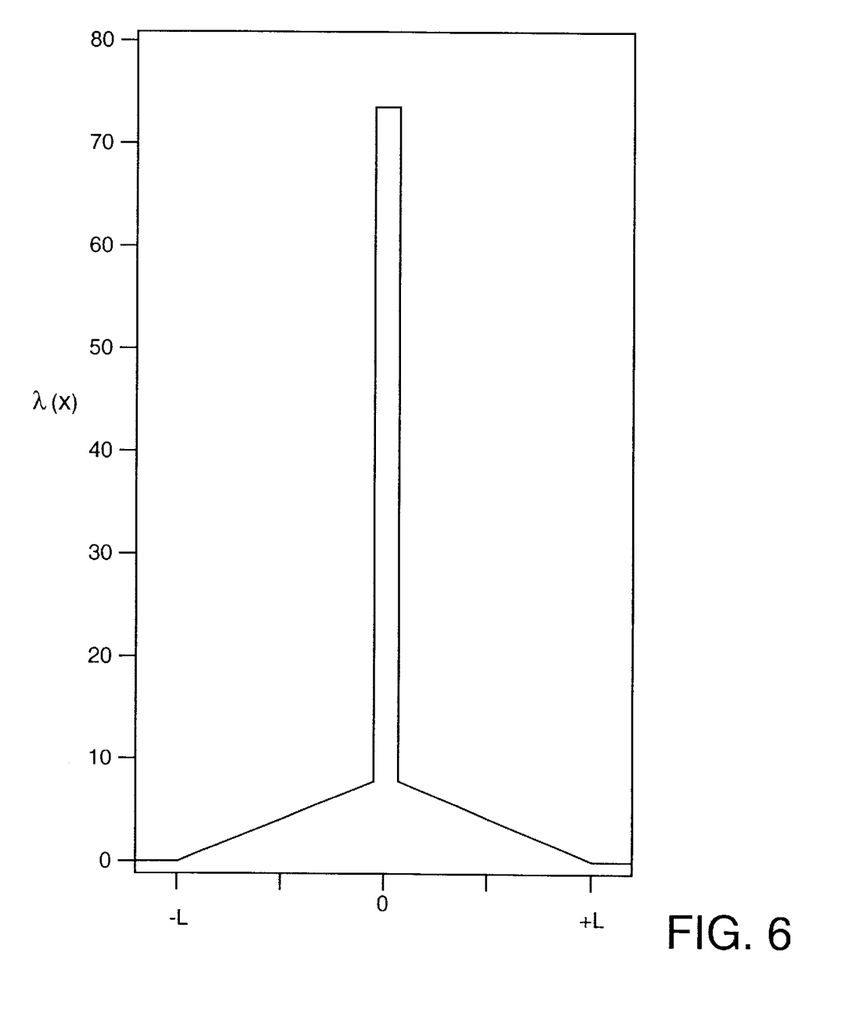
FIG. 6 is a graph illustrating the heater density function, $\lambda(x)$, for the mass flow sensors of the invention.

The combination of concentrated and distributed heat sources provides the desired symmetric triangular temperature profile in the flowing fluid, as shown in FIG. 5, and the desired heater density function $\lambda(x)$, as shown in FIG. 6. The heater density function shown in FIG. 6 is a composite of the distributed, uniformly varying heater density function shown in FIG. 5 and the heater density function of a concentrated heat source.

Preliminary tests on a prototype sensor of this design gave a zero-flow noise (nitrogen flow) equal to 1.3 parts in 10,000 of the full-scale flow signal. As a rough comparison, the best thermal mass flow controllers now on the market achieve a flow stability (at constant setpoint, nitrogen flow, as measured by an independent downstream flowmeter) of approximately 1 part in 2000 of their full scale flow signal valves. More typically, lower quality mass flow controllers have flow stabilities approximately 1 part in 400 of full scale.

The purpose of the concentrated heat source is to produce a sudden change in slope of the temperature distribution profile, which is needed between the individual uniformly varying heat sources to give a sharp apex to the triangular temperature distribution function. A true impulse, or spike, produces a true discontinuity in the slope of the temperature distribution function. This arrangement provides a much more accurately triangular temperature distribution function than can be obtained using prior art flow sensors, shown in FIG. 1, which do not use a concentrated heat source with the distributed heating elements.

The difference between a flow sensor employing only a pair of uniformly varying heating elements and a flow sensor employing an additional concentrated heat source between the heating elements can be seen in the respective temperature distribution profiles for the two sensors. The former flow sensor has an approximately triangular temperature distribution profile with a blunted apex which extends over a distance which depends on the surface heat loss coefficient and longitudinal heat conductance of the sensor conduit. The latter flow sensor has a triangular temperature distribution profile with a sharp, more clearly identifiable apex. The extent to which the apex of the temperature distribution profile is less than perfectly triangular is attributable to the width of the concentrated heat source and is not controlled by the tube surface loss function. Thus, the sensor employing the combination of distributed and concentrated heating systems is characterized by flow sensing advantages which are achievable on a shorter length of sensor conduit than that which can be achieved using only the uniformly varying heating elements. In addition, the sensor of the present invention requires less heating power to achieve the desired heat transfer between the sensor conduit and the fluid.

The signal to noise ratio of the flow sensor of the present invention is significantly improved over that of prior art flow sensors. As a result, the flow sensor of the present invention features improved resolution for more precise flow measurement and control, and significantly improved low flow performance. In addition, as a result of improved low flow performance, a significant extension of the flow rate measurement range is obtained. Moreover, because of the greater heat transfer efficiency, the total length of the heated portion of the sensor conduit can be reduced.

In addition, because the distribution of temperature with position along a cylindrical conduit of uniform diameter is a linear function, for each linear portion of the conduit the temperature distribution can be predicted, and the heat transfer for such a sensor tube is optimized, in contrast to prior art sensor tubes which provide more complicated, nonlinear temperature distribution functions. In particular, the Nusselt number becomes a simple, known constant over the linear portions of the temperature distribution function, rather than a complex function of heat source position and flow rate that requires elaborate, costly and time-consuming finite element modeling for its accurate determination. This greatly facilitates the development of a simple and accurate theoretical model for sensor output as a function of flow rate, conduit and fluid properties that is very convenient for instrument design.

A further advantage of the sensor of the present invention over prior art differential thermal flow sensors that do not employ a concentrated, centrally located heater becomes apparent at high fluid flow rates. When fluid flows at high velocity through any thermal flow sensor without a concentrated central heater, the high velocity flow tends to distort the zero-flow temperature profile by shifting the temperature peak downstream, i.e., within the length of conduit heated by the downstream sensing element. This reduces the effectiveness of the downstream sensing element, as the negative temperature gradient extends over only a portion of its length. The output signal from the downstream sensing element is thus diminished relative to the output signal from the upstream sensing element. In addition, the output signal of the affected sensing element is markedly nonlinear when the flow rate exceeds a certain threshold. In contrast, with the flow sensor of the present invention, the centrally located concentrated heater produces a triangular temperature distribution function with its apex at the location of the concentrated heater, even at high flow rates. The slope of the temperature distribution profile over the length of the downstream sensing element remains negative for much higher flow rates, which improves the linearity of the sensor output signal relative to prior art sensors. Thus, the sensor of the present invention is capable of extending the useful flow measurement range to lower and higher flows than can be accurately measured with prior art thermal mass flow sensors.

The sensor of the present invention also possesses unique advantages for incorporation into thermal mass flow meters and controllers that must function in very low pressure environments, such as at inlet pressures below 10 torr and outlet pressures in the tenths of a torr range. For such instruments it is essential to minimize the pressure drop along the flow conduit, which cannot be zero because the gases being metered possess finite viscosity. Solutions to this problem typically involve the specification of either single conduits of unusually large inside diameter, or conduits of moderate diameter in parallel with high-capacity bypass conduits. In both cases, typically only the low end of the sensor conduit flow measurement range is useful, in order to keep the viscous pressure drop as low as possible. Thus, thermal sensor conduits which are incorporated into such instruments typically operate in a mass flow measurement range in which the sensor zero-flow noise is significant and limits the utility and performance of the sensor. The sensor of the present invention, because of its very low zero-flow noise amplitude and its ability to accurately measure low mass flow rates without excessive noise, possesses substantial advantages over prior art thermal flow sensors for such low pressure operation.

The combination of distributed and concentrated heating systems to optimize the temperature distribution and associated heat transfer in a fluid flow sensor along the fluid flow path is applicable to any thermal mass flow meter or flow controller, and in particular to any mass flow meter or flow controller in which currently only a uniformly distributed heat source is employed.

Because certain changes may be made in the above apparatus without departing from the scope of the invention herein disclosed, it is intended that all matter contained in the above description or shown in the accompanying drawings shall be interpreted in an illustrative and not a limiting sense.

In particular, it is evident that the effects and benefits of the sensor of the invention may be achieved by arranging a combination of distributed heating and/or cooling elements with a concentrated central cooler, so as to achieve a temperature distribution along the active sensor conduit length that is essentially an inverted symmetrical triangle, with straight, linear sides but a temperature minimum at the triangle apex, rather than a maximum, as described above. Such a reversal of direction of the spatial variation in the temperature distribution does not constitute a significant departure from the invention disclosed herein and must be regarded as falling within the scope of the claims.

I claim:

1. A thermal mass flow sensor, comprising:

a flow sensor conduit adapted for fluid flow therethrough;

a first heating element, including a pair of distributed heat sources, each of said distributed heat sources disposed proximal to the sensor conduit and configured to establish a distributed and uniformly varying heater density along a portion of a heated length of the sensor conduit; and a second heating element, comprising a single concentrated heat source disposed proximal to the sensor conduit and between the distributed heat sources and configured to establish a concentrated heater density at a preselected location in the heated length of the sensor conduit, wherein the temperature distribution function of a fluid within the heated length of the sensor conduit is a substantially symmetrical triangular distribution function which varies linearly with position along the sensor conduit, with the apex of said triangular distribution occurring at the preselected location of the single concentrated heat source in the heated length of the sensor conduit.

2. A thermal mass flow sensor according to claim 1, wherein the distributed heat sources are symmetrically disposed on the sensor conduit with respect to the concentrated heat source.

3. A thermal mass flow sensor according to claim 2, wherein the concentrated heat source is disposed substantially at the midpoint of the heated length of the sensor conduit.

4. A thermal mass flow sensor according to claim 2, wherein the distributed heat sources each comprises a resistive heat source which transfers minimum heat per unit length at or near the ends of the heated length of the sensor conduit and maximum heat at or near the midpoint of the heated length of the sensor conduit.

5. A thermal mass flow sensor according to claim 4, wherein the resistive heat sources comprise electrically resistive coils having windings disposed around the sensor conduit, and wherein the windings are most widely spaced at or near the outer ends of the heated length of the conduit and most closely spaced near the concentrated heat source.

6. A thermal mass flow sensor according to claim 4, wherein the resistive heat sources comprise resistive films deposited onto the sensor conduit to a desired width and thickness, wherein at least one of the thickness and the width of the films is greatest at or near the outer ends of the heated length of the conduit and least near the concentrated heat source.

7. A thermal mass flow sensor according to claim 4, wherein the distributed heat sources comprise radiant heat sources.

8. A thermal mass flow sensor according to claim 1, further including means for applying an electrical current to each of the distributed and concentrated heat sources.

9. A thermal mass flow sensor according to claim 8, wherein the pair of distributed heat sources further are adapted to generate a signal representative of the fluid temperature differential at symmetric points along the upstream and downstream portions of the heated length of the sensor conduit, and thus of the rate of flow of fluid through the sensor conduit.

10. A thermal mass flow sensor according to claim 1, further comprising one or more temperature sensing elements disposed on the sensor conduit and electrically insulated from the first and second heating elements.

11. A thermal mass flow sensor according to claim 10, wherein the temperature sensing element comprises a resistive coil wound uniformly around the sensor conduit.

12. A thermal mass flow sensor according to claim 10, wherein the temperature sensing element comprises a resistive film deposited on the sensor conduit.

* * * * *

UNITED STATES PATENT AND TRADEMARK OFFICE
CERTIFICATE OF CORRECTION

PATENT NO.   : 6,446,504 B1
DATED        : September 10, 2002
INVENTOR(S)  : Thomas O. Maginnis, Jr.

It is certified that error appears in the above-identified patent and that said Letters Patent is hereby corrected as shown below:

After column 12, insert Appendix I and Appendix II as follows:

Signed and Sealed this

Eleventh Day of February, 2003

JAMES E. ROGAN
*Director of the United States Patent and Trademark Office*

APPENDIX I

Derivation of the Optimal Heater Density Function

The heater density function $\lambda(x)$ (in watts/meter) needed to ensure a given zero flow temperature distribution $T(x)$ is readily derived from the following equation for the requisite heater density.

We assume the desired temperature distribution is the optimal triangular form:

$$(1) \quad T(x) = T_{MAX} \cdot \left(1 - \left|\frac{x}{L}\right|\right), \text{ for } |x| \leq L$$

x is the position along the length of the sensor tube, T(x) is the mean (over the tube metal cross-section) tube temperature elevation, and 2L is the length of the sensor tube between thermal clamps.

This is substituted into Equation (2), the heat conduction equation, with a power source that depends on position, and a surface loss per unit length that is proportional to the temperature elevation.

$$(2) \quad -\frac{KA}{h'} \cdot \frac{d^2T}{dx^2} + T = \frac{\lambda(x)}{h'}$$

We need the second derivative of T(x). Note that T(x) has a discontinuity in slope at the apex of the triangular function at x=0. The first derivative is $$(3) \quad \frac{dT}{dx} = -T_{MAX} \cdot \frac{1}{L} \cdot sgn\left(\frac{x}{L}\right), \text{ for } |x| \leq L$$

sgn is the sign function, +1 or -1 depending on the sign of its argument. The second derivative is $$(4) \quad \frac{d^2T}{dx^2} = -2 \cdot T_{MAX} \cdot \left(\frac{1}{L}\right)^2 \cdot \delta\left(\frac{x}{L}\right)$$

The second derivative is proportional to a negative impulse or $\delta$ function, i.e., a point source.

When substituted in Equation (2), multiplication by the negative constant there makes it a positive point source of heat.

Substituting into (2) the expressions for T(x) from (1) and $\frac{d^2T}{dx^2}$ from (4) yields the required heat source density.

(5) $$\lambda(x) = h' \bullet T_{MAX} \bullet \left[ \left(1 - \left|\frac{x}{L}\right|\right) + \frac{KA}{h'} \bullet 2 \bullet \left(\frac{1}{L}\right)^2 \bullet \delta\left(\frac{x}{L}\right) \right], for |x| \leq L$$

This is a tapered heater density function with a point heater at the center.

APPENDIX II

Derivation of Heater Density Function for Triangle Temperature Function with Parabolic Center Match The heater density function (in watts/meter) needed to ensure a given zero flow temperature distribution T(x) is readily derived from the following equation for the requisite heater density. This has previously been done for a symmetrical triangular temperature function. To achieve the sharp point at the apex then required a central point heater of specified power as well as a tapered (nonuniform) winding on inlet and outlet.

Here we assume the desired temperature distribution is again triangular in the upstream and downstream sense regions, but instead of a sharp point at the apex, a smoothly rounded parabolic peak extending over a short, finite width, G, is placed at the center. This is matched in value and slope to the temperature distribution profile of the upstream and downstream heated portions to give a triangular temperature distribution function in the flanks, but with a continuous slope in the center matching region:

(1) $$T(x) = T_0 \bullet \left[ 1 - \frac{G}{4 \bullet L} - \frac{x^2}{L \bullet G} \right], \; for \; |x| \leq \frac{G}{2}$$

$$T(x) = T_0 \bullet \left( 1 - \left|\frac{x}{L}\right| \right), \; for \; \frac{G}{2} \leq |x| \leq L$$

x is the position along the length of the sensor tube, T(x) is the mean (over the tube cross-section) tube temperature elevation, 2L is the total length of tube between thermal clamps, and G is the length of the center matching region.

This is substituted into Equation (2). This is the heat conduction equation, with a power source that depends on position, and a surface loss per unit length that is proportional to the temperature elevation.

(2) $$\frac{\lambda(x)}{h'} = -\frac{KA}{h'} \bullet \frac{d^2T}{dx^2} + T$$

We need the second derivative of T(x). Note that T(x) has a discontinuity in second derivative at the connection points $(|x| = G/2)$. The first derivative is (3) $$\frac{dT}{dx} = -T_0 \bullet \frac{1}{L} \bullet \left( \frac{2 \bullet x}{G} \right), \; for \; |x| \leq \frac{G}{2}$$

$$\frac{dT}{dx} = -T_0 \cdot \frac{1}{L} \cdot sgn(\frac{x}{L}), \text{ for } \frac{G}{2} \leq |x| \leq L$$

sgn is the sign function, +1 or -1, depending on the sign of its argument. The second derivative is (4)
$$\frac{d^2T}{dx^2} = -\left(\frac{2 \cdot T_0}{L \cdot G}\right), \text{ for } |x| \leq \frac{G}{2}$$

$$\frac{d^2T}{dx^2} = 0, \text{ for } \frac{G}{2} < |x| \leq L$$

The second derivative is a negative constant in the matching region, zero elsewhere. When substituted in Equation (2), multiplication by the negative constant there makes it a positive uniform source of heat in the matching region. To this must be added the term proportional to T(x) in (1) to get the heat source density required to achieve the smoothly matched temperature function (1).

Substituting into (2) the expressions for T(x) from (1) and from (4) yields the required heater density.

(5)
$$\lambda(x) = h' \cdot T_0 \cdot \left| 1 - \frac{G}{4 \cdot L} + \frac{2}{L \cdot G} \cdot \frac{KA}{h'} - \frac{x^2}{L \cdot G} \right|, \text{ for } |x| \leq \frac{G}{2}$$

$$\lambda(x) = h' \cdot T_0 \cdot \left[ 1 - \left|\frac{x}{L}\right| \right], \text{ for } \frac{G}{2} < |x| \leq L$$

In the upstream and downstream portions of the conduit, this is a tapered heater density function. In the center matching region, this is a uniform, high intensity heater density function combined with a smaller parabolic term that matches the slope at $(|x| = G/2)$. It is evident that this heater density function will have the correct shape as $G \to 0$.

This heater configuration offers more flexibility for manufacture than the previously described point central heater plus tapered heater, since it allows the idealized point heater with infinite heater density to be replaced by a non-uniform matching heater of finite spatial extent and finite peak heater density. Since there is a practical limit to how short a central "point" heater can be, and how much heater power can be effectively delivered to such a "point" heater without melting the wire insulation, this design permits the central heater to have a finite length which is convenient for manufacture.